US011814822B2

(12) United States Patent
White (10) Patent No.: US 11,814,822 B2
(45) Date of Patent: Nov. 14, 2023

(54) PLUMBING FITTING

(71) Applicant: AALBERTS INTEGRATED PIPING SYSTEMS LIMITED, Doncaster (GB)

(72) Inventor: Samuel White, Nottinghamshire (GB)

(73) Assignee: AALBERTS INTEGRATED PIPING SYSTEMS LIMITED, Doncaster (GB)

(*) Notice: Subject to any disclaimer, the term of this patent is extended or adjusted under 35 U.S.C. 154(b) by 279 days.

(21) Appl. No.: 17/279,826

(22) PCT Filed: Sep. 17, 2019

(86) PCT No.: PCT/GB2019/052612
§ 371 (c)(1),
(2) Date: Mar. 25, 2021

(87) PCT Pub. No.: WO2020/065268
PCT Pub. Date: Apr. 2, 2020

(65) Prior Publication Data
US 2021/0340741 A1    Nov. 4, 2021

(30) Foreign Application Priority Data
Sep. 27, 2018   (GB) .................................... 1815768

(51) Int. Cl.
*E03B 7/07*   (2006.01)
*F16K 27/06*  (2006.01)
(Continued)

(52) U.S. Cl.
CPC ............... *E03B 7/072* (2013.01); *E03B 7/07* (2013.01); *E03B 7/074* (2013.01); *F16K 27/065* (2013.01);
(Continued)

(58) Field of Classification Search
CPC .. E03B 7/072; B01D 35/147; B01D 2201/302
See application file for complete search history.

(56) References Cited

U.S. PATENT DOCUMENTS 3,669,147 A    6/1972   Farrell
3,669,148 A    6/1972   Burkhalter, Jr. et al.
(Continued)

FOREIGN PATENT DOCUMENTS

CN         2859117 Y     1/2007
CN       201078483 Y     6/2008
(Continued)

OTHER PUBLICATIONS

International Search Report and Written Opinion for corresponding PCT application No. PCT/GB2019/052612, dated Jan. 24, 2020.

*Primary Examiner* — Reinaldo Sanchez-Medina
(74) *Attorney, Agent, or Firm* — Notaro, Michalos & Zaccaria P.C.

(57) ABSTRACT

A plumbing fitting with a body having a flow path extending therethrough, and a receptacle disposed in the body is disclosed. The receptacle is arranged to releasably receive a mechanism is movable between a first operational position in which the flow path extends through the receptacle and the mechanism, and a second position in which the flow path bypasses the mechanism. In the second position, the mechanism can be released from the receptacle while a fluid flows through the flow path.

16 Claims, 8 Drawing Sheets

(51) Int. Cl.
*F16K 35/06* (2006.01)
*F16K 43/00* (2006.01)
*F16K 31/528* (2006.01)

(52) U.S. Cl.
CPC .......... *F16K 31/5286* (2013.01); *F16K 35/06* (2013.01); *F16K 43/001* (2013.01); *F16K 43/005* (2013.01)

(56) References Cited

U.S. PATENT DOCUMENTS

| | | | |
|---|---|---|---|
| 3,683,966 A | 8/1972 | Payne | |
| 3,854,696 A | 12/1974 | Keyes et al. | |
| 3,891,001 A | 6/1975 | Botnick | |
| 4,253,481 A | 3/1981 | Sarlls, Jr. | |
| 4,664,152 A | 5/1987 | O'Mara | |
| 5,628,492 A | 5/1997 | Lee | |
| 6,123,094 A | 9/2000 | Breda | |
| 8,950,052 B2 * | 2/2015 | Kruckenberg | B01D 35/30 210/232 |
| 10,584,040 B2 * | 3/2020 | Campbell | B01D 35/306 |
| 2002/0084068 A1 | 7/2002 | Hugger | |
| 2004/0194822 A1 | 10/2004 | Breda | |
| 2009/0020470 A1 * | 1/2009 | Bassett | B01D 27/106 210/235 |
| 2009/0230063 A1 | 9/2009 | Hawkins et al. | |
| 2014/0083951 A1 | 3/2014 | Malgorn et al. | |
| 2015/0143989 A1 | 5/2015 | Burmester | |
| 2018/0065067 A1 | 3/2018 | Ardes | |

FOREIGN PATENT DOCUMENTS

| | | |
|---|---|---|
| CN | 202074068 U | 12/2011 |
| CN | 202371205 U | 8/2012 |
| CN | 203309176 U | 11/2013 |
| CN | 203532865 U | 4/2014 |
| CN | 205013774 U | 2/2016 |
| CN | 205401805 U | 7/2016 |
| CN | 107489785 A | 12/2017 |
| CN | 206708390 U | 12/2017 |
| CN | 206708463 U | 12/2017 |
| DE | 3526581 A1 | 2/1987 |
| DE | 19540580 A1 | 5/1997 |
| DE | 20204658 U1 | 7/2003 |
| EP | 2818776 B1 | 12/2014 |
| FR | 1233159 A | 10/1960 |
| FR | 2041861 A5 | 2/1971 |
| FR | 2412768 A1 | 7/1979 |
| GB | 691430 A | 5/1953 |
| GB | 1014246 A | 12/1965 |
| GB | 2548810 A | 10/2017 |
| IN | 201641029015 | 3/2018 |
| KR | 101168755 B1 | 7/2012 |
| KR | 20170043334 A | 4/2017 |
| KR | 101867954 B1 | 6/2018 |
| WO | 2015173811 A1 | 11/2015 |
| WO | 2017137965 A1 | 8/2017 |

* cited by examiner

PLUMBING FITTING

TECHNICAL FIELD OF THE INVENTION

The present invention relates to a plumbing fitting, and to a plumbing system comprising the plumbing fitting. In particular, but not exclusively, the present invention relates to domestic plumbing fittings and systems.

BACKGROUND TO THE INVENTION

A plumbing system is one that conveys fluid to, through and from buildings using pipes, fixtures and other components.

Plumbing fittings are used in a plumbing system to perform various functions. An example of a known plumbing fitting is a pressure independent control valve (PICV), which has a mechanism adapted to regulate and control fluid flow and pressure, and to control pressure differential across the valve. Most plumbing systems include a variety of plumbing fittings, each configured for a specific function.

Over time, or due to a fault, a plumbing fitting connected to a plumbing system may need to be maintained or repaired. As plumbing systems convey fluid therethrough at elevated pressure, to maintain or repair the plumbing fitting it is standard practice to isolate the fitting (e.g. by closing connector flow valves at opposite ends of the fitting) from the system and then carry out maintenance or repair work on the fitting. This can be challenging, time consuming and expensive, and may require additional tools or even trained personnel (e.g. a plumber). Moreover, this can introduce problems to the system, such as pressure imbalances, which can be time consuming and expensive to repair.

It is an object of the present invention to solve one or more of the abovementioned or other problems.

SUMMARY OF THE INVENTION

According to a first aspect of the present invention, there is provided a plumbing fitting comprising: a body having a flow path extending therethrough; a receptacle disposed in the body, the receptacle arranged to releasably receive a mechanism; wherein the receptacle is movable between a first, operational, position in which the flow path extends through the receptacle and the mechanism, and a second position in which the flow path bypasses the mechanism whereby in the second position the mechanism can be released from the receptacle whilst a fluid flows through the flow path.

In use, in the first, operational, position the mechanism can perform its predetermined function (e.g. to regulate and control fluid flow and pressure). In the second position the mechanism can be accessed for maintenance or repair, whilst the fluid bypasses the mechanism and continues to flow through the flow path.

Accordingly, in embodiments of the present invention, the mechanism can be maintained or repaired without isolating the plumbing fitting from the plumbing system to which it is connected. This can be more time and cost efficient than isolating the plumbing fitting, which is required to maintain or repair known plumbing fittings. Also, in embodiments of the present invention, the mechanism can be accessed for maintenance or repair without additional plumbing tools and/or without trained personnel. This can increase time and cost efficiency relative to known plumbing fittings. Moreover, in embodiments of the present invention, the mechanism can be maintained or repaired using fewer steps than are required to maintain or repair known plumbing fittings. This can reduce the risk of introducing complications to the plumbing system to which the plumbing fitting is connected.

Thus, embodiments of the present invention provide a plumbing fitting that can be more conveniently and efficiently maintained or repaired than known plumbing fittings.

The body may be a manifold. The body may comprise two or more connectors, each having a bore therethrough. Each connector may be adapted to connect to a pipe of a plumbing system. Each connector may be disposed on an outside of the body. There may be an inlet connector having an inlet bore. There may be an outlet connector having an outlet bore. The body may comprise a cavity in which the receptacle is disposed. The cavity may be accessible through an opening provided on the body. The body may comprise at one end an opening to the cavity, and at the opposite end a closed base.

The flow path may extend between the inlet bore and the outlet bore. The flow path may be adapted to convey a liquid through the plumbing fitting. The flow path may be adapted to convey a liquid at non-ambient or elevated pressures.

The receptacle may be a housing arranged to releasably house the mechanism. The housing may be arranged to releasably enclose a proportion of the mechanism within it. The housing may be arranged to releasably enclose at least 40%, 50%, 60%, 70%, 80%, 90% or 95% of the volume of the mechanism within it.

The receptacle may be movable between the first, operational, position and the second position manually, mechanically and/or electronically. The receptacle may be movable between the first, operational, position and the second position using movement means. The movement means may be provided between the body and the receptacle. The movement means may be provided between a surface of the body cavity and an outer surface of the receptacle. The movement means may comprise a slide mechanism. The slide mechanism may comprise a guide and a slide that is slidable in the guide. The slide mechanism may be adapted to constrain movement of the receptacle between the first, operational, position and the second position. In this way the slide mechanism may prevent the receptacle from being removed or inadvertently ejected from the body. The movement means may operable manually, mechanically and/or electronically. Any other suitable movement means may be used, as will be known to a person skilled in the art.

The receptacle may comprise a cavity adapted to releasably receive the mechanism. For example, the receptacle cavity may comprise a screw thread. The screw thread may correspond to a screw thread on the mechanism.

The receptacle may comprise two or more apertures. The apertures may comprise an inlet aperture and an outlet aperture.

In the first, operational, position the inlet aperture may align with the inlet bore. In the first, operational, position the outlet aperture may align with the outlet bore.

In use, in the first, operational, position fluid may flow into the inlet bore in the inlet connector, then through the inlet aperture and the mechanism, then through the outlet aperture, then through the outlet bore in the outlet connector.

In the second position the inlet aperture may be displaced from the inlet bore. In the second position the outlet aperture may be displaced from the outlet bore. In the second position the flow path through the body may be directed around the receptacle.

In use, in the second position fluid may flow through the inlet bore in the inlet connector, then around the receptacle, then through the outlet bore in the outlet connector.

In alternative embodiments the receptacle may comprise two or more secondary apertures. The secondary apertures may be provided at respective ends of a bypass path. The bypass path may extend through the receptacle but may be isolated from the mechanism. There may be a secondary inlet aperture and a secondary outlet aperture.

In such alternative embodiments, in use, in the first, operational, position fluid may flow through the inlet bore in the inlet connector, then through the inlet aperture and the mechanism, then through the outlet aperture, then through the outlet bore in the outlet connector.

In such alternative embodiments, in use, in the secondary position fluid may flow through the inlet bore in the inlet connector, then through the secondary inlet aperture, then through the secondary outlet aperture, then through the outlet bore in the outlet connector.

The receptacle may comprise a chamfered section around which fluid can flow in the second position. The chamfered section may be adapted to optimise fluid flow through the flow path and around the receptacle in the second position. The chamfered section may be displaced from the inlet bore in the first, operational, position. The chamfered section may be in alignment with the inlet bore in the second position. The chamfered section may be provided between the inlet aperture and the base of the receptacle. The chamfered section may comprise a first portion arranged parallel to the longitudinal axis of the inlet bore. The chamfered section may comprise a second portion arranged parallel to the longitudinal axis of the receptacle.

The plumbing fitting may comprise sealing means. The scaling means may be adapted to prevent inadvertent leakage of fluid. The sealing means may be provided between the body and the receptacle. The sealing means may be provided on the receptacle and/or on the body. The sealing means may be provided on an outer surface of the receptacle and/or on a surface of the body cavity. The or each sealing member may be a sealing ring. The sealing means may comprise one or more first sealing members, one or more second sealing members and/or one or more third sealing members.

The or each first sealing member may be arranged substantially parallel or substantially perpendicular to the longitudinal axis of the receptacle. The or each first sealing member may be provided between the receptacle cavity opening and the inlet and outlet apertures.

In the first, operational, position the or each first sealing member may be adapted to prevent leakage around the receptacle and out of the body cavity opening.

In the second position the or each first sealing member may be outside of the body cavity.

The or each second sealing member may be arranged between the inlet aperture and the outlet aperture. The or each second sealing member may be arranged such that a portion of the or each second sealing member is provided between the inlet aperture and the chamfered section. The or each second sealing member may be arranged such that another portion of the or each second sealing member is provided between the outlet aperture and the receptacle cavity opening.

In the first, operational, position, the or each second sealing member may be arranged between the inlet bore and the outlet bore. In the first, operational, position, the or each second sealing member may be arranged such that a portion of the or each second sealing member is arranged between the inlet bore and the body base. In the first, operational, position, the or each second sealing member may be arranged such that another portion of the or each second sealing member is arranged between the outlet bore and the body cavity opening. In the first, operational, position, the or each second sealing member may be adapted to prevent fluid from escaping from the inlet bore to the outlet bore around the receptacle, instead of following the intended route through the mechanism within the receptacle.

In the second position the or each second sealing member may be arranged between the body cavity opening and the inlet and outlet bores. In the second position the or each second sealing member may be adapted to seal against leakage out of the body cavity opening.

The or each third sealing member may be arranged below the inlet aperture and the outlet aperture. The or each third sealing member may be arranged substantially parallel to a line extending between the inlet aperture and the outlet aperture. The or each third sealing member may be arranged between the inlet and outlet apertures and the receptacle base.

In the first, operational, position, the or each third sealing member may be arranged at an oblique angle (e.g. 45 degrees) to the longitudinal axis of the receptacle. In the first, operational, position, the or each third sealing member may be arranged between the body base and the inlet outlet bores. In the first, operational, position the or each third sealing member may be adapted to prevent leakage into the body cavity below the receptacle.

In the second position, the or each third sealing member may be arranged between the inlet and outlet bores and the body cavity opening. In the second position, the or each third sealing member may be adapted to seal against flow into the receptacle inlet and outlet apertures.

The plumbing fitting may comprise a lock configured to releasably lock the receptacle to the body in the first, operational, position. In this way, the lock may prevent the receptacle from inadvertently ejecting from the body. This could otherwise occur, e.g. due to a pressure surge. The lock may comprise one or more first locking portions adapted to interlock with one or more second locking portions. The or each first locking portion may be provided on the body. The or each second locking portion may be provided on the receptacle. Any other suitable lock may be used, as will be known to a person skilled in the art. Non-limiting examples of other locks include clips and other suitable fastening means.

The plumbing fitting may comprise the mechanism. The mechanism may be releasably mounted in the receptacle. The mechanism may be releasably mounted in the cavity provided in the receptacle. The mechanism may be releasably mounted in the receptacle by securing means. The securing means may comprise a screw and thread connection, twist connection or push-fit connection. Any other suitable securing means may be used, as will be known to a person skilled in the art. The mechanism may be manually, mechanically and/or electronically releasable from the receptacle.

The mechanism may be a valve, filter, measurement device or combination thereof. The mechanism may be selected from an anti-back-flow valve, commissioning valve, control valve, serviceable valve, metering valve, balancing valve, regulating valve, mixing valve, thermostatic valve, safety valve, isolation valve, dosing valve, service valve, filtration device, measuring device and combination thereof. In particular, the mechanism may be a pressure independent control valve (PICV).

The second position may be a flushing position, servicing position, maintenance position, bypass position and/or mechanism replacement position.

According to a second aspect of the present invention, there is provided a plumbing system comprising a plurality of pipes connected to the plumbing fitting according to the first aspect of the present invention.

Non-limiting examples of plumbing systems include water supply systems (e.g. water supply systems for internal use in domestic or industrial buildings), drain-waste vent systems, sewage systems, septic systems, greywater recovery systems, treatment systems, hydronic systems, domestic heating systems and industrial heating systems.

DETAILED DESCRIPTION

In order that the invention may be more clearly understood, an embodiment thereof will now be described, by way of example only, with reference to the accompanying drawings, in which.

With reference to FIGS. 1-8, a plumbing fitting 1 comprises a body 2 having a flow path 3 extending therethrough; a receptacle 4 disposed in the body 2; and a functional mechanism 5 releasably received in the receptacle 4. A person skilled in the art will appreciate that the mechanism may be any suitable mechanism, as desired in order to carry out a particular function. For example, the mechanism may be a valve, filter or measurement device; such as an anti-back-flow valve, commissioning valve, control valve, serviceable valve, metering valve, balancing valve, regulating valve, mixing valve, thermostatic valve, safety valve, isolation valve, dosing valve, service valve, filtration device or measuring device. In this particular embodiment, the mechanism 5 is that of a pressure independent control valve (PICV).

The receptacle 4 can be manually (i.e. by hand) moved between a first, operational, position (as shown in FIGS. 1, 2, 7 and 8) in which the flow path 3 extends through the receptacle 4 and the mechanism 5, and a second position (as shown in FIGS. 3 to 6) in which the flow path 3 bypasses the mechanism 5 whereby in the second position the mechanism 5 can be released from the receptacle 4 whilst a fluid flows through the flow path 3.

The body 2 has a connector inlet 6 and a connector outlet 7 disposed on opposing, outer sides thereof, arranged co-axially, with their axis at around 45 degrees to the axis of the body cavity, the receptacle 4 and the mechanism 5. The connectors 6, 7 are adapted to connect to pipes of a plumbing system (not shown). The flow path 3 extends through and between the connectors 6, 7, via an inlet bore in the inlet connector 6 to an outlet bore in the outlet connector 7. The body 2 has at one end an opening to a cavity, the opening defined by an annular lip 10; and at an opposite end a closed base 11. The body cavity is adapted to receive the receptacle 4, to thereby provide a secure fit between the body 2 and the receptacle 4.

Figure 1:
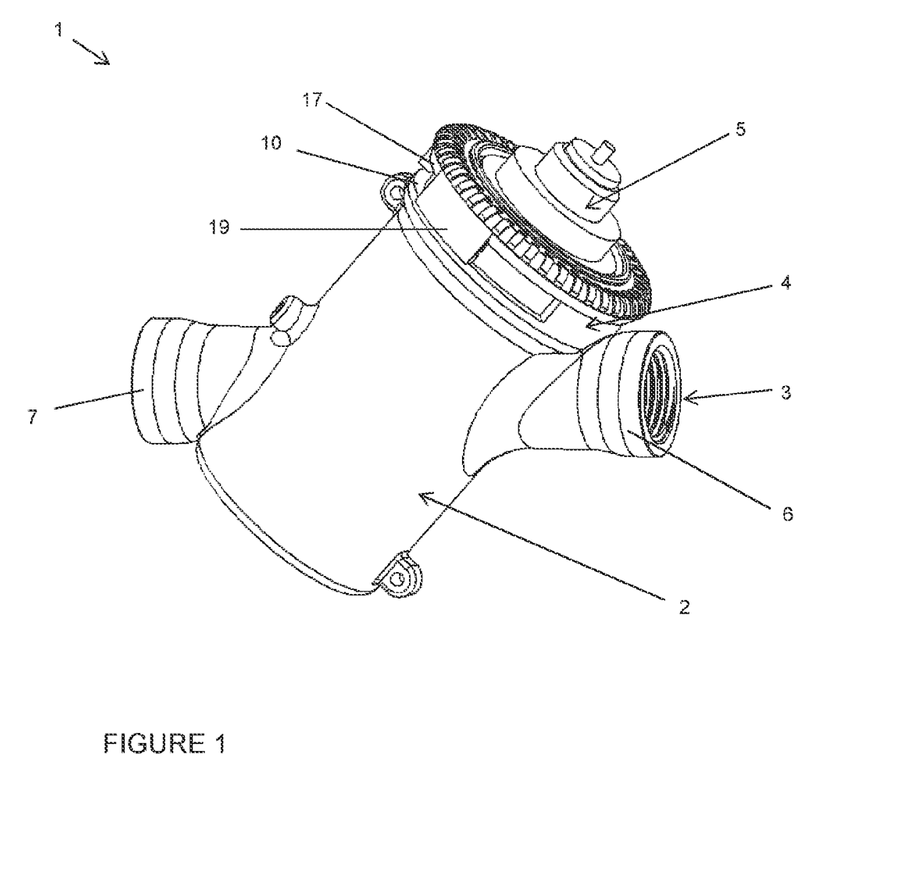
FIG. 1 shows an isometric side view of a plumbing fitting according to an embodiment of the present invention, wherein the plumbing fitting is configured in the first, operational, position.
Figure 2:
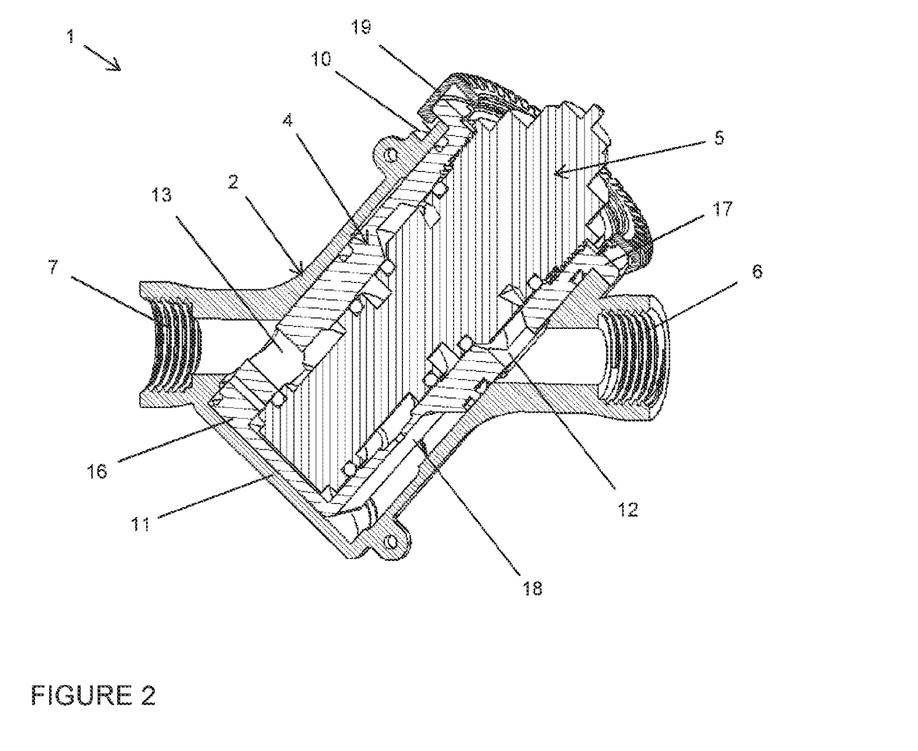
FIG. 2 shows a cross sectional side view of the plumbing fitting of FIG. 1, wherein the plumbing fitting is configured in the first, operational position.
Figure 3:
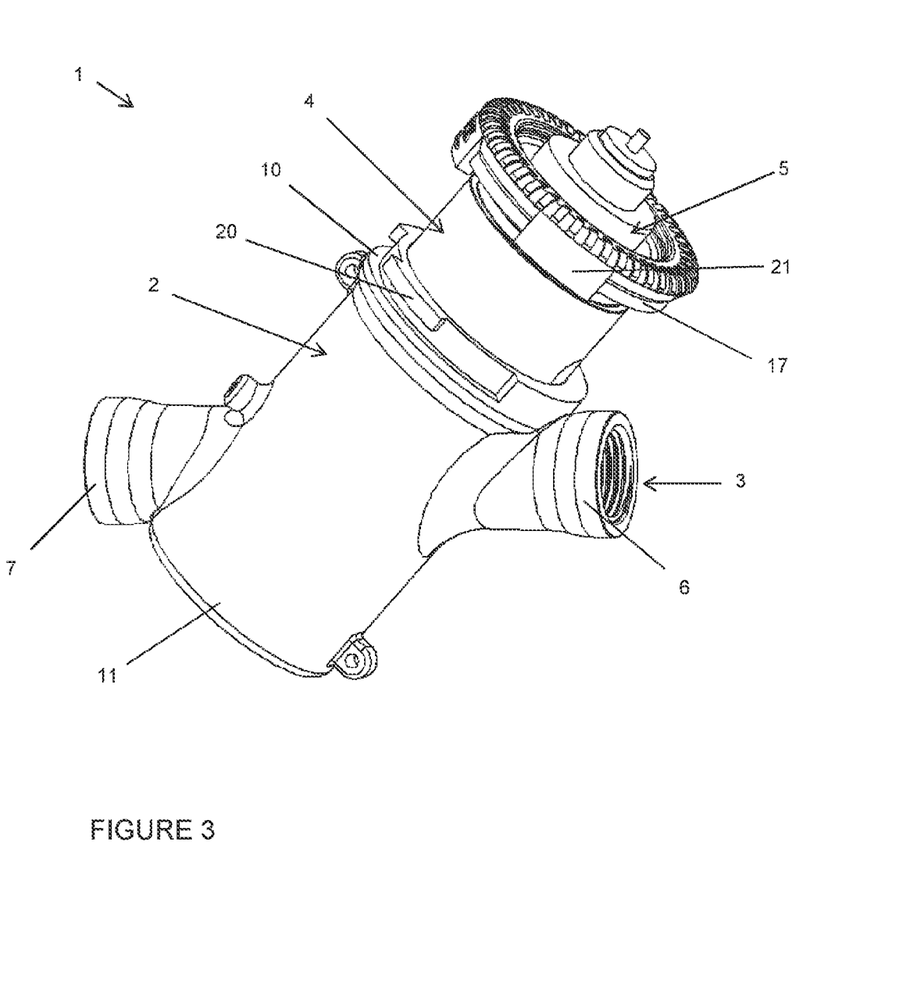
FIG. 3 shows an isometric side view of the plumbing fitting of FIG. 1, wherein the plumbing fitting is configured in the second positon.
Figure 4:
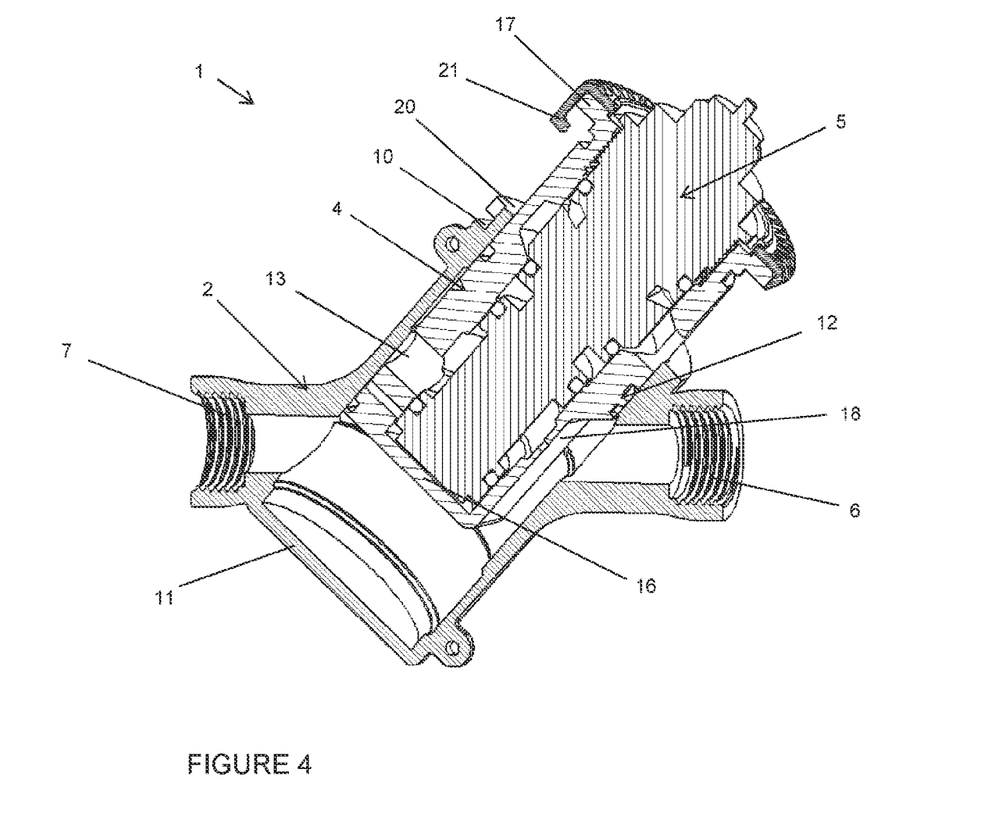
FIG. 4 shows a cross sectional side view of the plumbing fitting of FIG. 1, wherein the plumbing fitting is configured in the second position.
Figure 6:
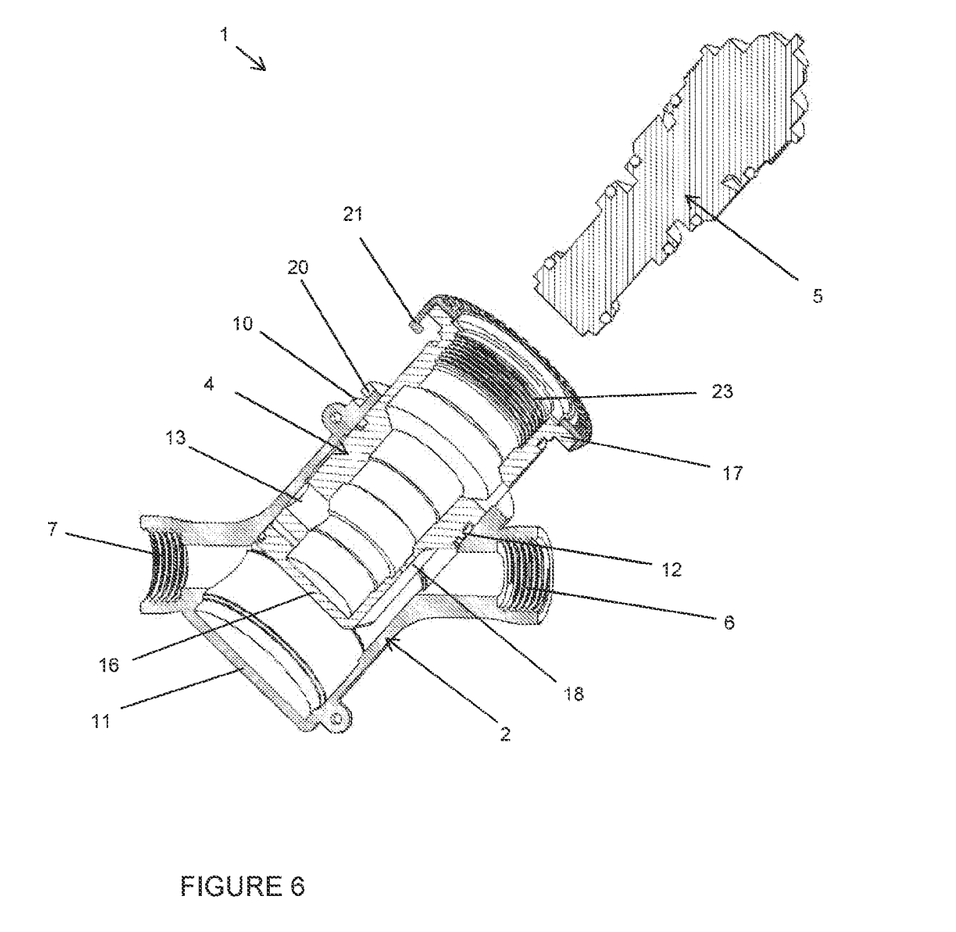
FIG. 6 shows an exploded cross sectional side view of the plumbing fitting of FIG. 1, wherein the plumbing fitting is configured in the second position and the mechanism is released from the receptacle.

As shown in FIGS. 2, 4 and 6, the receptacle 4 has an inlet aperture 12 and an outlet aperture 13 disposed on opposing, outer sides thereof. The inner diameters of the inlet aperture 12 and outlet aperture 13 are substantially the same as the inner diameters of the inlet bore and the outlet bore. The receptacle 4 has a substantially cylindrical form, with at one end an opening to a cavity for releasably receiving the mechanism 5 and at an opposite end a closed base 16. An annular rim 17 defines the receptacle opening.

A chamfered section 18 is provided between the inlet aperture 12 and the base 16. The chamfered section 18 is adapted to optimise fluid flow through the flow path 3 in the second position. In use, in the second position, fluid can flow around the chamfered section 18. The chamfered section 18 comprises a first portion arranged substantially parallel to the longitudinal axis of the bores, and a second sloping portion arranged substantially parallel to the longitudinal axis of the receptacle 4. In the first, operational, position, the chamfered section 18 is displaced from the inlet bore, towards the body base 1. In the second position the chamfered section 18 is in alignment with the inlet bore.

The receptacle 4 is receivable base-first into the body cavity. When the plumbing fitting 1 is configured in the first, operational, position, the receptacle base 16 is adjacent the body base 11.

Figure 7:
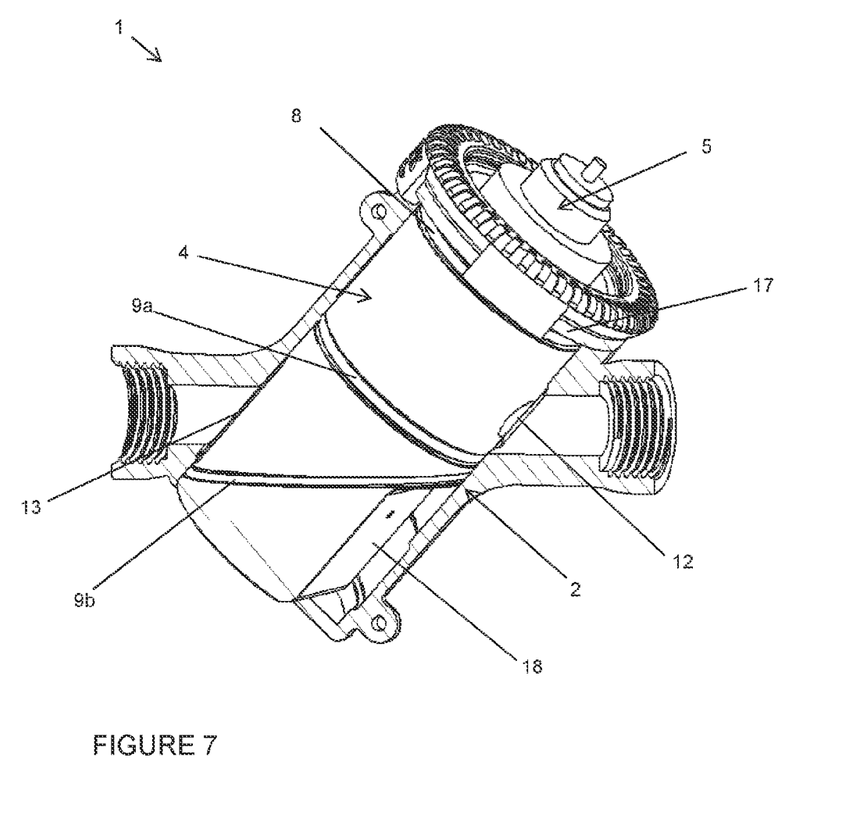
FIG. 7 shows a part, cross sectional side view of the plumbing fitting of FIG. 1, wherein the plumbing fitting is configured in a first, operational, position, and sealing rings are shown.

With reference to FIG. 7, the receptacle 4 has sealing means adapted to prevent inadvertent leakage of fluid between the body 2 and the receptacle 4. The sealing means comprises an upper ring 8, a first lower ring 9a and a second lower ring 9b.

The upper ring 8 is provided on an outer circumferential surface of the receptacle 4, towards the annular rim 17 and above the inlet and outlet apertures 12, 13. The upper ring 8 is substantially perpendicular to the longitudinal axis of the receptacle 4. In the first, operational, position the upper ring 8 prevents leakage around the receptacle 4 and out of the body opening. In the second (flushing) position the upper ring 8 is outside of the body cavity.

The first lower ring 9a and the second lower ring 9b are provided on an outer circumferential surface of the receptacle 4. The first lower ring 9a is arranged between the inlet 12 and the outlet 13, substantially perpendicular to the longitudinal axis of the receptacle 4, such that a portion of the first lower ring 9a is provided between the inlet aperture and the chamfered section 18, and another portion of the first lower ring 9a is provided between the outlet aperture 13 and the annular rim 17. The second lower ring 9b is arranged below the inlet 12 and the outlet 13, adjacent the chamfered section 18, at an angle of about 45 degrees to the axis of the receptacle 4 and substantially parallel to the line between the apertures 12, 13, between both apertures 12, 13 and the receptacle base 16.

The first lower ring 9a is arranged, in the first, operational, position, between the inlet bore and outlet bore, such that a portion of the first lower ring 9a is arranged between the inlet bore and the body base 11 and another portion of the first lower ring 9a is arranged between the outlet bore and the body cavity opening. This prevents fluid escaping from the inlet bore to the outlet bore around the receptacle 4, instead of following the intended route through the mechanism 5 within the receptacle 4. In the second position, the first lower ring 9a is arranged between the body cavity opening and the inlet bore and the outlet bore, sealing against leakage out of the body cavity opening.

The second sealing ring 9b is arranged at an angle, in the first, operational, position, between the body base 11 and both the inlet bore and the outlet bore so as to prevent leakage into the body cavity below the receptacle 11. In the second position, the second sealing ring 9b is arranged between the two bores 6, 7 and the body cavity opening to seal against flow into the receptacle inlet and outlet apertures 12, 13.

Figure 8:
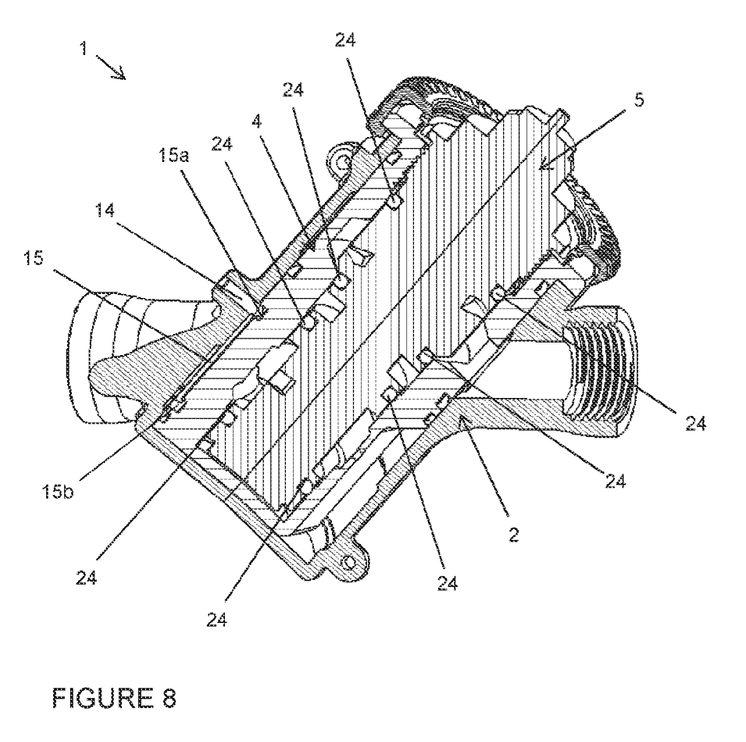
FIG. 8 shows an alternative, cross sectional side view of the plumbing fitting of FIG. 1, wherein the plumbing fitting is configured in a first, operational, position, and a slide mechanism is shown.

With reference to FIG. 8, the plumbing fitting 1 is provided with a slide mechanism adapted to facilitate movement between the first, operational, position and the second position. The slide mechanism comprises a protrusion 14 provided on the body 2, which protrusion 14 projects into a guide 15 provided on a corresponding outer surface of the receptacle 4. The guide 15 is closed at opposite ends thereof, to prevent movement of the receptacle 4 beyond first and second end-points 15a, 15b. Thus, when the receptacle 4 is moved between the first, operational, position and the second position, the guide 15 is moved axially relative to the slide 14, and the protrusion moves from the first end-point 15a to the second end-point 15b. The protrusion 14 is a screw which is adapted to correspond with a first indent at the first end-point 15a and with a second indent at the second end-point 15b. The indents project deeper into the outer surface of the receptacle 4 than the guide 15. The screw 14 can be screwed via a thread in an aperture through the body 2 into the first indent to thereby secure the receptacle 4 in the first position, or into the second indent to thereby secure the receptacle 4 in the second position. Alternatively, the screw 14 can be unscrewed from the first indent and the second indent such that the receptacle 4 can be moved between the first, operational, position and the second position, with the screw 14 confined within the guide 15 and by the respective end points 15a, 15b.

The plumbing fitting 1 is provided with a twist lock 19 comprising first lock portions 20 provided on the body 2; and corresponding second lock portions 21 provided on the receptacle 4. The second lock portions 21 are adapted to interlock with the first lock portions 20. Thus, in the first, operational, position, upon twisting the receptacle 4 relative to the body 2, such that the first lock portions 20 interlock with the second lock portions 21, the receptacle 4 can be secured to the body 2. By the reverse process, the twist lock 19 can be released by untwisting the receptacle 4 from the body 2, such that the first lock portions 20 are released from the second lock portions 21.

Figure 5:
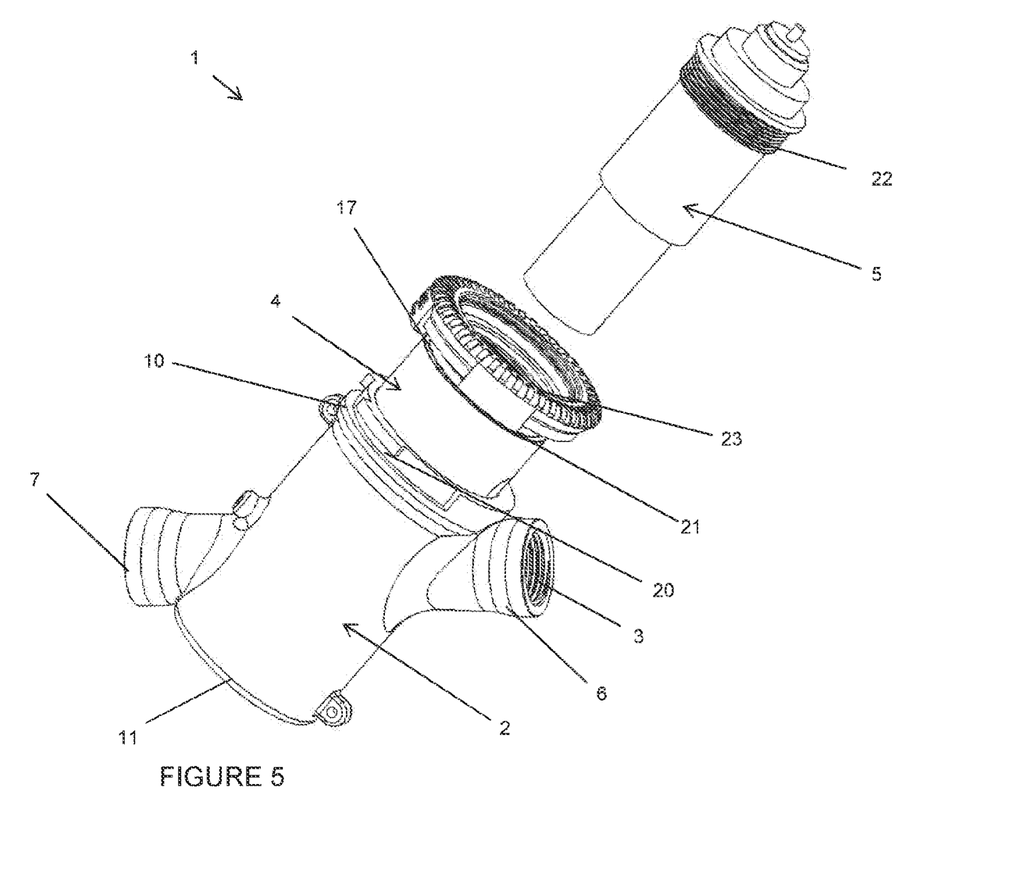
FIG. 5 shows an isometric side view of the plumbing fitting of FIG. 1, wherein the plumbing fitting is configured in the second position and the mechanism is released from the receptacle.

The plumbing fitting 1 comprises a screw 22 and thread 23 arrangement adapted to releasably secure the mechanism 5 to the receptacle 4 (as shown in FIGS. 5 and 6). Once the mechanism 5 is secured to the receptacle 4, the receptacle 4 can be moved from the second position to the first, operational, position.

As shown in FIG. 8, the receptacle 4 comprises a number of internal sealing surfaces arranged to receive sealing rings 24 of the mechanism 5. The mechanism sealing rings 24 prevent leakage of fluid between the mechanism 5 and the receptacle cavity.

With reference to FIGS. 1, 2, 7 and 8, where the plumbing fitting 1 is configured in the first, operational, position, the annular rim 17 lies flush with the annular lip 10; and the inlet bore and outlet bore are in alignment with the apertures 12, 13.

In use, in the first, operational, position fluid can flow via the flow path 3, into the inlet bore in the inlet connector 6, then through the inlet aperture 12 and the mechanism 5, then through the outlet aperture 13, then through the outlet bore in the outlet connector 7. In this way, the mechanism 5 can perform its predetermined function (e.g. in the case of a pressure independent control valve (PICV) mechanism, to control and regulate flow, and to control the pressure differential across the PICV).

With reference to FIGS. 3 to 6, where the plumbing fitting 1 is configured in the second position, the annular rim 17 is spaced from the annular lip 10; and the inlet 12 and the apertures 12, 13 are displaced from the inlet bore and the outlet bores, such that the chamfered section 18 is in alignment with the inlet bore.

In use, in the second position fluid can flow via the flow path 3 through the inlet bore in the inlet connector 6, then around the receptacle 4, then through the outlet bore in the outlet connector 7. Hence, fluid cannot enter the inlet 12 or the outlet 13, which are displaced from the inlet and outlet bores, and are sealed off by the sealing means 9b.

In this way, in the second position the mechanism 5 can be accessed for maintenance or repair, as desired or required, whilst fluid flows through the flow path 3, without isolating/disconnecting the plumbing fitting 1 from the system to which it is attached. In particular, most regulating valves rely on the user removing the working components prior to flushing/cleaning the system. This involves draining the system in order to remove the sensitive components. If these components are not removed then flushing through them can clog the small orifices with debris or damage the workings. The system described allows the user to withdraw the regulating mechanism to a flushing position which is isolated from the flow. This protects the regulating mechanism from damage during flushing. The system does not need to be drained therefore simplifying and speeding up the process.

The invention claimed is:

1. A plumbing fitting comprising:
    a body having a flow path extending therethrough;
    a receptacle disposed in the body, the receptacle arranged to releasably receive a mechanism;
    wherein the receptacle is movable between a first; operational, position in which the flow path extends through the receptacle and the mechanism, and a second position in which the flow path bypasses the mechanism whereby in the second position the mechanism can be released from the receptacle whilst a fluid flows through the flow path; wherein the mechanism is a control or regulating valve.

2. A plumbing fitting as claimed in claim 1 wherein the body comprises an inlet connector and an outlet connector, each connector being adapted to connect to a plumbing system; wherein the inlet connector has an inlet bore therethrough, and the outlet connector has an outlet bore therethrough.

3. A plumbing fitting as claimed in claim 2 wherein the receptacle comprises two or more apertures; wherein the apertures comprise an inlet aperture and an outlet aperture; wherein in the first, operational, position, the inlet aperture aligns with the inlet bore and the outlet aperture aligns with the outlet bore; and in the second position the inlet aperture is displaced from the inlet bore and the outlet aperture is displaced from the outlet bore.

4. A plumbing fitting as claimed in claim 1 wherein the plumbing fitting comprises sealing means for preventing inadvertent leakage of fluid; and wherein the sealing means comprises one or more first sealing members, one or more second sealing members, and/or one or more third sealing members.

5. A plumbing fitting as claimed in claim 4, wherein the body comprises a body cavity in which the receptacle is disposed, wherein the body comprises at one end an opening to the body cavity, and at the opposite end a closed base, wherein in the first, operational, position the or each first sealing member is adapted to prevent leakage around the receptacle and out of the body cavity opening.

6. A plumbing fitting as claimed in claim 5 wherein the body comprises an inlet connector and an outlet connector, each connector being adapted to connect to a plumbing system; wherein the inlet connector has an inlet bore therethrough, and the outlet connector has an outlet bore therethrough, wherein in the first, operational, position, the or each second sealing member may be adapted to prevent fluid from escaping from the inlet bore to the outlet bore around the receptacle, instead of following the flow path through the mechanism within the receptacle; and in the second position the or each second sealing member is adapted to seal against leakage out of the body cavity opening.

7. A plumbing fitting as claimed in claim 4 wherein the body comprises a cavity in which the receptacle is disposed and the receptacle comprises two or more apertures; wherein the apertures comprise an inlet aperture and an outlet aperture; wherein in the first, operational, position the or each third sealing member is adapted to prevent leakage into the body cavity below the receptacle; and in the second position the or each third sealing member is adapted to seal against flow into the inlet aperture and the outlet aperture.

8. A plumbing fitting as claimed in claim 1 wherein the body comprises a cavity in which the receptacle is disposed and wherein the body comprises at one end an opening to the body cavity, and at the opposite end a closed base.

9. A plumbing fitting as claimed in a claim 1 wherein the receptacle comprises a cavity adapted to releasably receive the mechanism.

10. A plumbing fitting as claimed in claim 1 wherein the receptacle comprises two or more apertures; wherein the apertures comprise an inlet aperture and an outlet aperture.

11. A plumbing fitting as claimed in claim 1 wherein the receptacle comprises a chamfered section around which fluid can flow in the second position; and wherein the chamfered section comprises a first portion arranged parallel to the longitudinal axis of an inlet bore; and a second portion arranged parallel to the longitudinal axis of the receptacle.

12. A plumbing fitting as claimed in claim 1 wherein the plumbing fitting comprises a lock configured to releasably lock the receptacle to the body in the first, operational, position; and wherein the lock comprises one or more first locking portions adapted to interlock with one or more second locking portions, to thereby lock the receptacle to the body in the first, operational, position.

13. A plumbing fitting as claimed in claim 1 wherein the second position is a flushing position, servicing position, maintenance position, bypass position and/or mechanism replacement position.

14. A plumbing fitting according to claim 1 wherein the receptacle is a housing arranged to releasably enclose at least 40% of the volume of the mechanism within it.

15. A plumbing fitting according to claim 1 wherein the receptacle moves axially between the first and second positions.

16. A plumbing system comprising a plurality of pipes connected to the plumbing fitting according to claim 1; and wherein the system is a water supply system, drain-waste vent system, sewage system, septic system, greywater recovery system, treatment system, hydronic system, domestic heating system or industrial heating system.

* * * * *